United States Patent

(12) United States Patent
Fujita et al.

(10) Patent No.: US 10,224,563 B2
(45) Date of Patent: Mar. 5, 2019

(54) FRAME BODY, CELL FRAME, CELL STACK, AND REDOX FLOW BATTERY

(71) Applicant: Sumitomo Electric Industries, Ltd., Osaka-shi (JP)

(72) Inventors: Hayato Fujita, Osaka (JP); Takashi Kanno, Osaka (JP); Kenji Motoi, Osaka (JP); Takeshi Yamana, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/549,104

(22) PCT Filed: Oct. 5, 2016

(86) PCT No.: PCT/JP2016/079680
§ 371 (c)(1),
(2) Date: Aug. 4, 2017

(87) PCT Pub. No.: WO2018/066095
PCT Pub. Date: Apr. 12, 2018

(65) Prior Publication Data
US 2018/0248215 A1 Aug. 30, 2018

(51) Int. Cl.
*H01M 8/00* (2016.01)
*H01M 8/18* (2006.01)
*H01M 8/0202* (2016.01)
*H01M 8/0273* (2016.01)
*H01M 2/38* (2006.01)
*H01M 4/86* (2006.01)

(52) U.S. Cl.
CPC ............ *H01M 8/188* (2013.01); *H01M 2/38* (2013.01); *H01M 4/86* (2013.01); *H01M 8/0202* (2013.01); *H01M 8/0273* (2013.01); *H01M 2004/8684* (2013.01); *H01M 2004/8689* (2013.01); *Y02E 60/528* (2013.01)

(58) Field of Classification Search
CPC .............................. H01M 8/18; H01M 8/2483
See application file for complete search history.

(56) References Cited

U.S. PATENT DOCUMENTS 6,410,178 B1 * 6/2002 Matsukawa ......... H01M 8/0208
429/514
2015/0125768 A1 * 5/2015 Mosso ................ H01M 8/0273
429/418

FOREIGN PATENT DOCUMENTS

| JP | 2000-260460 A | 9/2000 |
| JP | 2015-079738 A | 4/2015 |
| JP | 2016-091835 A | 5/2016 |

* cited by examiner

*Primary Examiner* — Cynthia H Kelly
*Assistant Examiner* — Monique M Wills
(74) *Attorney, Agent, or Firm* — Venable LLP; Tamatane J. Aga; Laura G. Remus

(57) ABSTRACT

A frame body that is a part of a flat cell frame for a cell stack of a redox flow battery, and that supports, on an outer peripheral side of a bipolar plate of the cell frame, the bipolar plate,
the frame body including a frame-facing surface that is to face, when a plurality of the cell frames are stacked, a frame body of another cell frame that is adjacent to the cell frame in a stacking direction, wherein the frame-facing surface has a surface roughness Ra of 0.03 μm or more and 3.2 μm or less.

6 Claims, 7 Drawing Sheets

FRAME BODY, CELL FRAME, CELL STACK, AND REDOX FLOW BATTERY

TECHNICAL FIELD

The present invention relates to a frame body, a cell frame, a cell stack, and a redox flow battery.

BACKGROUND ART

Patent Literature 1 describes a cell stack in which a cell frame including a bipolar plate, a positive electrode, a membrane, a negative electrode, and a cell frame are repeatedly stacked, and the stack body is sandwiched between supply/drainage plates; and a redox flow battery including the cell stack. The cell frames include a bipolar plate and a frame body disposed on the outer periphery of the bipolar plate. In this configuration, a single cell is formed between the bipolar plates of adjacent cell frames.

CITATION LIST

Patent Literature

PTL 1: Japanese Unexamined Patent Application Publication No. 2015-79738

SUMMARY OF INVENTION

A frame body according to the present disclosure is a frame body that is a part of a flat cell frame for a cell stack of a redox flow battery, and that supports, on an outer peripheral side of a bipolar plate of the cell frame, the bipolar plate, the frame body including a frame-facing surface that is to face, when a plurality of the cell frames are stacked, a frame body of another cell frame that is adjacent to the cell frame in a stacking direction, wherein the frame-facing surface has a surface roughness Ra of 0.03 µm or more and 3.2 µm or less.

A cell frame according to the present disclosure includes
the frame body according to the present disclosure, and a bipolar plate supported by the frame body.

A cell stack according to the present disclosure is
a cell stack including a plurality of cell frames stacked, the cell stack being used for a redox flow battery,
wherein the cell frames include the cell frame according to the present disclosure.

A redox flow battery according to the present disclosure is
a redox flow battery including a cell stack, a positive electrode electrolyte tank, and a negative electrode electrolyte tank,
wherein the cell stack is the cell stack according to the present disclosure.

DESCRIPTION OF EMBODIMENTS

Technical Problem

Figure 1:
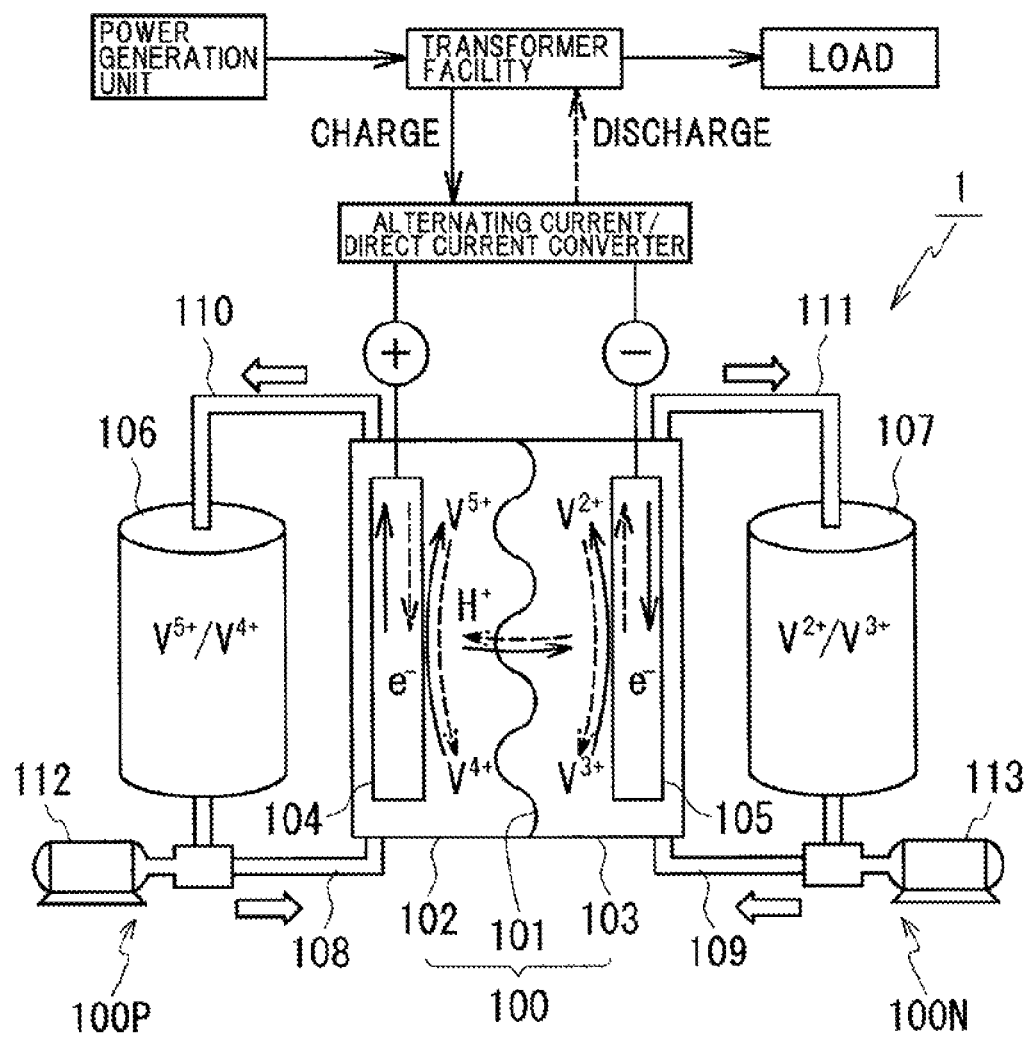
FIG. 1 illustrates the principle of operations of a redox flow battery according to an embodiment.

When cell frames stacked have a frame body that has excessively smooth surfaces, adjacent cell frames may become considerably displaced from each other due to, for example, vibration or impact during transportation of the cell stack to the installation site, or an internal pressure applied by electrolytes during circulation of the electrolytes through the cell stack. A considerable displacement of adjacent cell frames from each other may cause a problem of leakage, to the outside, of an electrolyte circulated through the cell stack. On the other hand, when cell frames stacked have a frame body that has excessively rough surfaces, large gaps tend to be formed between such frame bodies. This may cause a problem of leakage, to the outside, of an electrolyte circulated through the cell stack.

Accordingly, an object of the present disclosure is to provide a frame body and a cell frame that enable effective suppression of leakage, to the outside, of electrolytes circulated through the cell stack. Another object of the present disclosure is to provide a cell stack and a redox flow battery that are less likely to cause leakage, to the outside, of electrolytes within the cell stack.

Description of Embodiments According to Invention of the Present Application Features of embodiments according to the invention of the present application will be first listed and described.
<1> A frame body according to an embodiment is
a frame body that is a part of a flat cell frame for a cell stack of a redox flow battery, and that supports, on an outer peripheral side of a bipolar plate of the cell frame, the bipolar plate,
the frame body including a frame-facing surface that is to face, when a plurality of the cell frames are stacked, a frame body of another cell frame that is adjacent to the cell frame in a stacking direction,
wherein the frame-facing surface has a surface roughness Ra of 0.03 µm or more and 3.2 µm or less.

A surface roughness Ra described herein is arithmetical mean roughness defined in JIS B0601 (2001). When the frame-facing surface has a surface roughness Ra of 0.03 µm or more, adjacent cell frames are less likely to be displaced from each other during transportation of the cell stack or during circulation of electrolytes through the cell stack. When the frame-facing surface has a surface roughness Ra of 3.2 µm or less, large gaps are less likely to be formed between the frame bodies of adjacent cell frames. Thus, in a cell stack having such a configuration, during circulation of electrolytes through the cell stack, the electrolytes are less likely to leak to the outside.
<2> The frame body according to the embodiment may have a configuration in which the frame body includes a sealing groove into which a loop-shaped sealing member is inserted, wherein the sealing groove has an inner peripheral surface having a surface roughness Ra of 0.03 µm or more and 3.2 µm or less.

When the sealing groove has an inner peripheral surface having a surface roughness Ra of 0.03 µm or more, even when impact during transportation or an internal pressure due to electrolytes causes a pressure applied in a direction orthogonal to the stacking direction of cell frames, coming off of the loop-shaped sealing member from the sealing groove tends to be prevented. The loop-shaped sealing member becomes less likely to come off from the sealing groove because an appropriate frictional force is exerted between the inner peripheral surface of the sealing groove and the loop-shaped sealing member. When the sealing groove has a surface roughness Ra of 3.2 µm or less, the loop-shaped sealing member deformed by being fastened by a pair of cell frames firmly adheres to, with no gaps, the inner peripheral surface of the sealing groove. Thus, the sealing performance of the loop-shaped sealing member is enhanced and coming off of the loop-shaped sealing member from the sealing groove tends to be prevented.

<3> A cell frame according to an embodiment includes
the frame body according to the embodiment, and a bipolar plate supported by the frame body.

When the cell frame includes a frame body having a frame-facing surface that has a surface roughness Ra of 0.03 µm or more, adjacent cell frames are less likely to be displaced from each other during transportation of the cell stack or during circulation of electrolytes through the cell stack. When the frame-facing surface has a surface roughness Ra of 3.2 µm or less, large gaps are less likely to be formed between the frame bodies of adjacent cell frames. Thus, in a cell stack having such a configuration, during circulation of electrolytes through the cell stack, the electrolytes are less likely to leak to the outside.

<4> A cell stack according to an embodiment is
a cell stack including a plurality of cell frames stacked, the cell stack being used for a redox flow battery,
wherein the cell frames include the cell frame according to the embodiment.

When a cell stack includes cell frames having a frame body that has a surface roughness within the predetermined range, during circulation of electrolytes through the cell stack, the electrolytes are less likely to leak to the outside.

<5> The cell stack according to the embodiment may have a configuration in which the cell stack includes a loop-shaped sealing member disposed between frame bodies of a pair of the cell frames adjacent to each other in the stacking direction.

The presence of the loop-shaped sealing member enables effective prevention of leakage of electrolytes from between adjacent cell frames. In particular, a sealing groove formed in a frame body enables more effective suppression of leakage of the electrolytes.

<6> A redox flow battery according to an embodiment is
a redox flow battery including a cell stack, a positive electrode electrolyte tank, and a negative electrode electrolyte tank,
wherein the cell stack is the cell stack according to the embodiment.

Since the redox flow battery according to the embodiment includes the cell stack according to the embodiment, leakage of liquid from the cell stack is less likely to occur during operation.

Details of Embodiments According to the Present Invention

Hereinafter, redox flow batteries (RF batteries) according to embodiments will be described. However, the present invention is not limited to the configurations illustrated in the embodiments. The present invention is defined by Claims and is intended to embrace all the modifications within the meaning and range of equivalency of the Claims.

Embodiment 1

A redox flow battery (hereafter, an RF battery) according to an embodiment will be described on the basis of FIG. 1 to FIG. 7.

<<Rf Battery>>

The RF battery is one of electrolyte-circulation storage batteries, and is used for storage of electricity of new energy from solar photovoltaic power generation and wind power generation. As illustrated in FIG. 1, which illustrates the principle of operations of an RF battery 1, the RF battery 1 is a battery configured to be charged and discharged by means of the difference between the oxidation-reduction potential of active material ions contained in a positive electrode electrolyte, and the oxidation-reduction potential of active material ions contained in a negative electrode electrolyte. The RF battery 1 includes a cell 100, which is divided, by a membrane 101 permeable to hydrogen ions, into a positive electrode cell 102 and a negative electrode cell 103.

The positive electrode cell 102 includes a positive electrode 104 therein; and, to the positive electrode cell 102, a positive electrode electrolyte tank 106 storing a positive electrode electrolyte is connected via ducts 108 and 110. The duct 108 is equipped with a pump 112. These members 106, 108, 110, and 112 constitute a positive electrode circulation mechanism 100P configured to circulate the positive electrode electrolyte. Similarly, the negative electrode cell 103 includes a negative electrode 105 therein; and, to the negative electrode cell 103, a negative electrode electrolyte tank 107 storing a negative electrode electrolyte is connected via ducts 109 and 111. The duct 109 is equipped with a pump 113. These members 107, 109, 111, and 113 constitute a negative electrode circulation mechanism 100N configured to circulate the negative electrode electrolyte. The electrolytes stored in the tanks 106 and 107 are circulated through the cells 102 and 103 with the pumps 112 and 113 during charge and discharge. When charge or discharge is not performed, the pumps 112 and 113 are stopped and the electrolytes are not circulated.

<<Cell Stack>>

Figure 2:
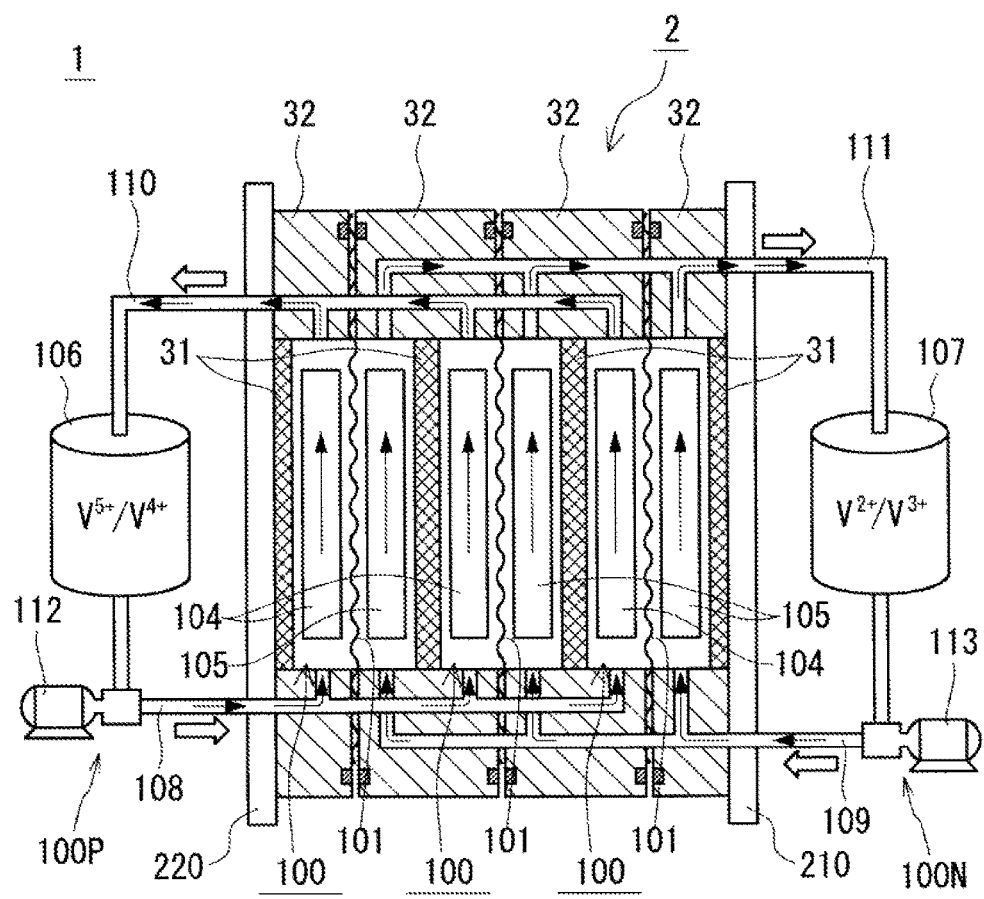
FIG. 2 is a schematic configuration view of a redox flow battery according to an embodiment.
Figure 3:
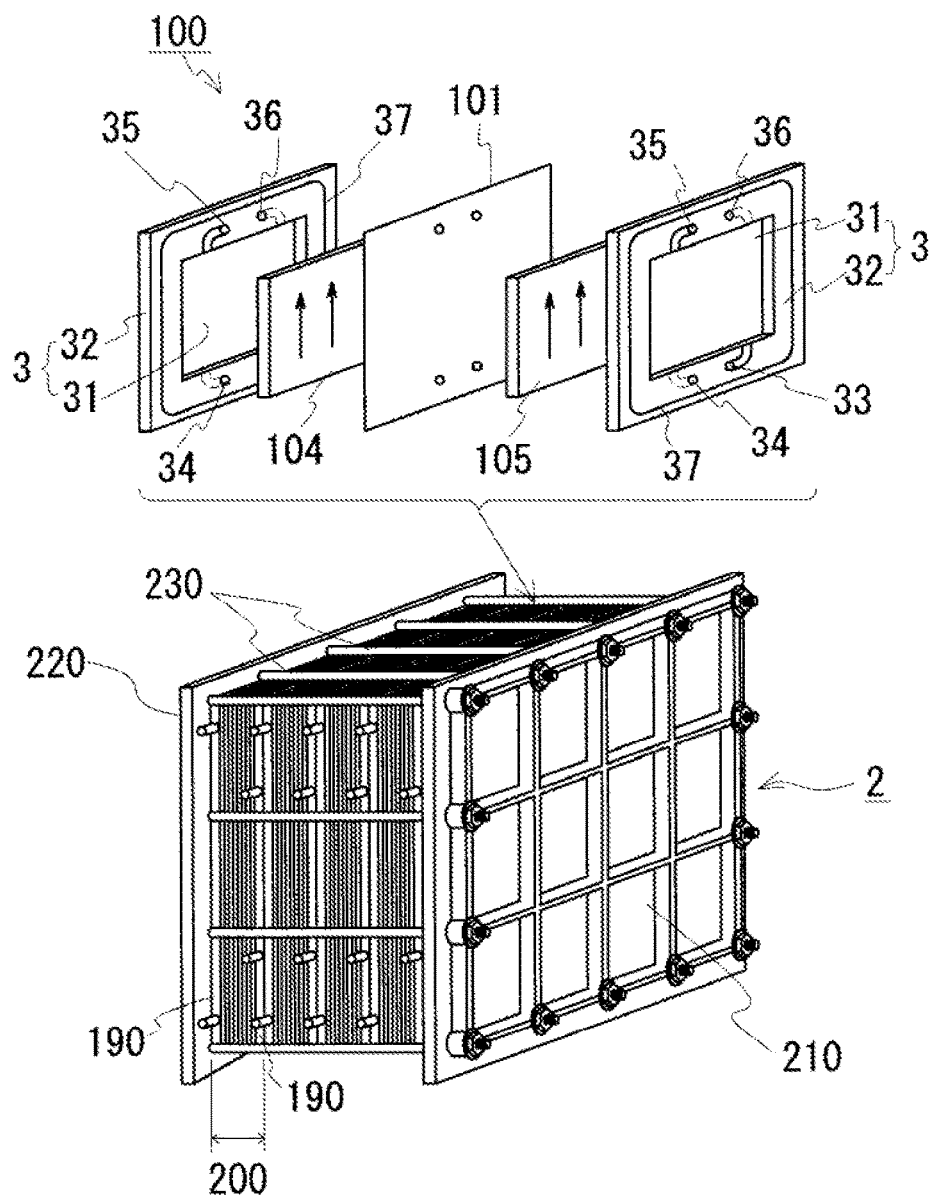
FIG. 3 is a schematic configuration view of a cell stack according to an embodiment.

The cell 100 is normally formed within a structure referred to as a cell stack 2, which is illustrated in FIG. 2 and FIG. 3. The cell stack 2 is constituted by sandwiching a stack structure referred to as a substack 200 (FIG. 3), from its both sides by two end plates 210 and 220, and by fastening the substack 200 with a fastening mechanism 230 (in the configuration provided as an example in FIG. 3, plural substacks 200 are used).

Such a substack 200 (FIG. 3) has a configuration in which the cell frame 3, the positive electrode 104, the membrane 101, and the negative electrode 105 are repeatedly stacked, and the stack body is sandwiched between supply/drainage plates 190 and 190 (refer to the lower drawing in FIG. 3; omitted in FIG. 2). Such a cell frame 3 includes a frame body 32 having a through window and a bipolar plate 31, which covers the through window. The positive electrode 104 is disposed so as to be in contact with one of the surfaces of the bipolar plate 31, and the negative electrode 105 is disposed so as to be in contact with the other surface of the bipolar plate 31. In this configuration, a single cell 100 is formed between the bipolar plates 31 fit into adjacent cell frames 3.

Supply and drainage of electrolytes through the supply/drainage plates 190 and 190 to and from the cell 100 are performed with liquid supply manifolds 33 and 34 and liquid drainage manifolds 35 and 36 formed in the cell frame 3. The positive electrode electrolyte is supplied through the liquid supply manifold 33, then through an inlet slit formed in one surface of the cell frame 3 (the surface illustrated as being exposed in the drawing), to the positive electrode 104; and the positive electrode electrolyte is drained through an outlet slit formed in an upper portion of the cell frame 3 to the liquid drainage manifold 35. Similarly, the negative electrode electrolyte is supplied through the liquid supply manifold 34, then through an inlet slit (represented by broken lines) formed in the other surface of the cell frame 3 (the surface illustrated as being hidden in the drawing), to the negative electrode 105; and the negative electrode electrolyte is drained through an outlet slit (represented by broken lines) formed in an upper portion of the cell frame 3 to the liquid drainage manifold 36. Loop-shaped sealing members 37 such as O-rings or flat gaskets are individually disposed between the cell frames 3 to suppress leakage of electrolytes from the substack 200.

When cell frames stacked have a frame body that has excessively smooth surfaces, adjacent cell frames may become considerably displaced from each other due to, for example, vibration or impact during transportation of the cell stack to the installation site, or an internal pressure applied by electrolytes during circulation of the electrolytes through the cell stack. A considerable displacement of adjacent cell frames from each other may cause a problem of leakage, to the outside, of an electrolyte circulated through the cell stack. On the other hand, when cell frames stacked have a frame body that has excessively rough surfaces, large gaps tend to be formed between such frame bodies. This may cause a problem of leakage, to the outside, of an electrolyte circulated through the cell stack. In order to address the problems, the RF battery 1 of this example has a feature that a portion of the frame body 32 of the cell frame 3 has a surface roughness within a predetermined range. This feature will be described in detail on the basis of FIG. 4 to FIG. 7.

Figure 4:
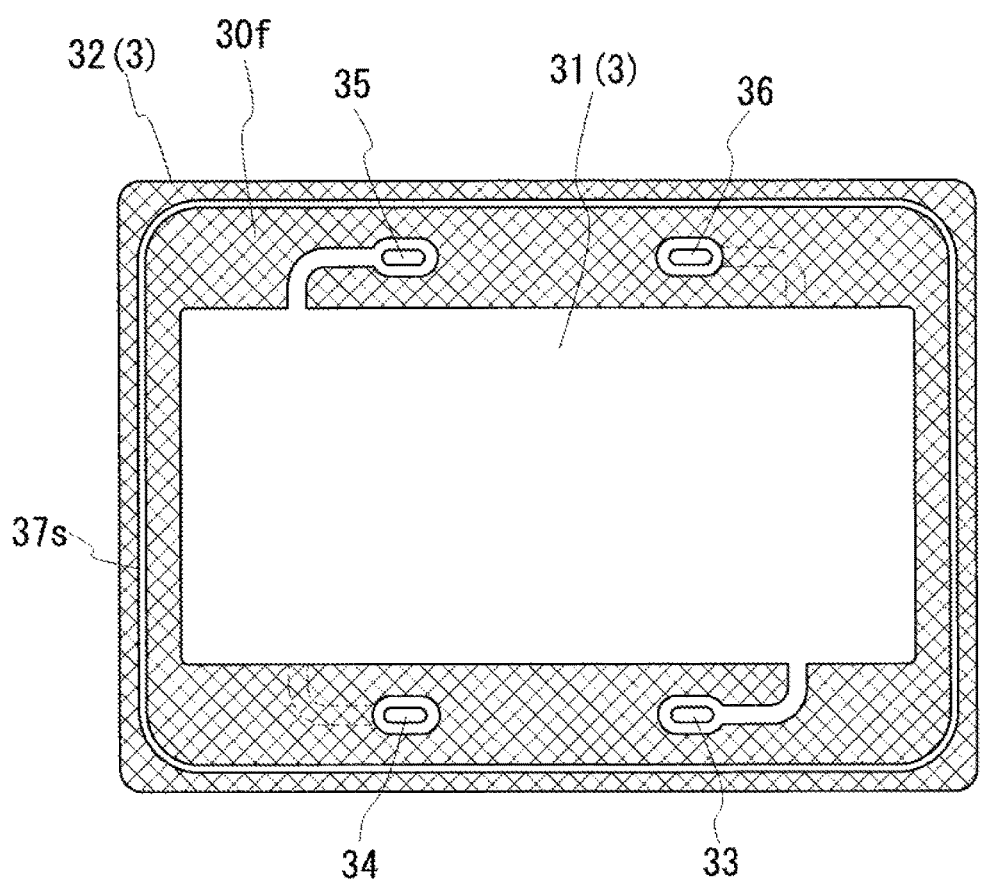
FIG. 4 is a plan view of a cell frame according to an embodiment when the cell frame is viewed from its one surface side.
Figure 5:
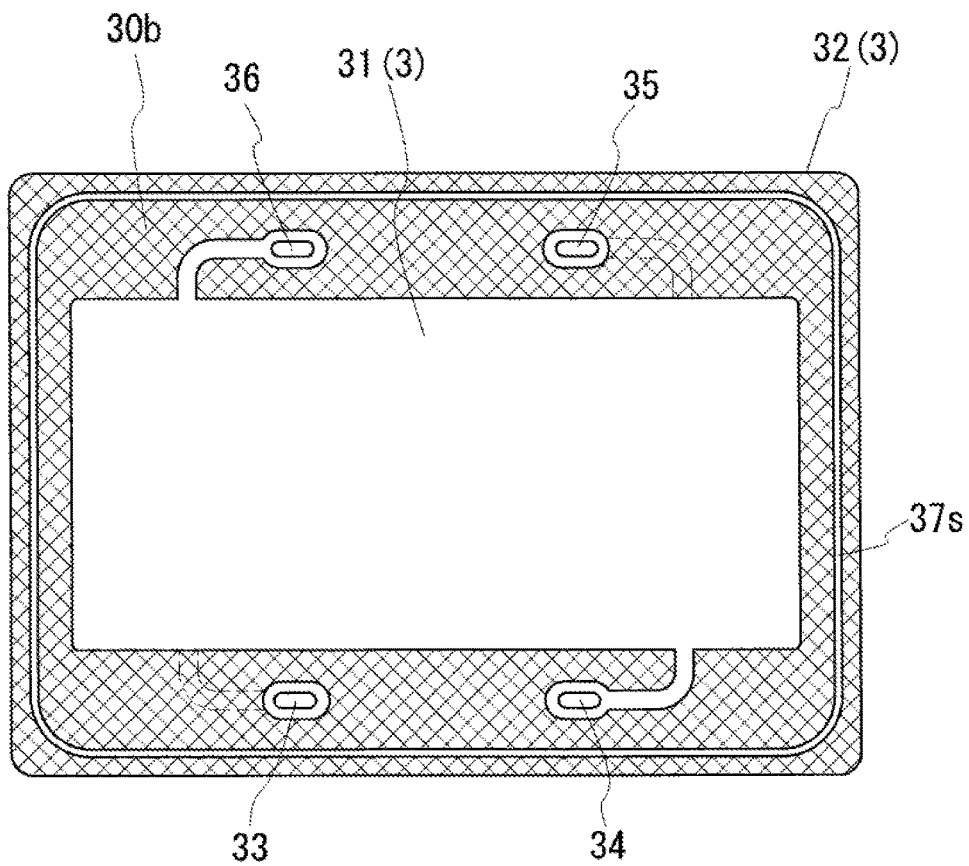
FIG. 5 is a plan view of a cell frame according to an embodiment when the cell frame is viewed from the other surface side.

FIG. 4 is a plan view of the cell frame 3 according to Embodiment 1 when the cell frame 3 is viewed from its one surface side. FIG. 5 is a plan view of the cell frame 3 in FIG. 4 when the cell frame 3 is viewed from the other surface side. A sealing groove 37s, which is formed along the outer periphery of the cell frame 3 and surrounds all the manifolds 33 to 36, is a groove into which the loop-shaped sealing member 37 in FIG. 3 is inserted. Incidentally, FIGS. 4 and 5 illustrate a mere example and do not particularly place limitations in terms of the shapes and positions of the manifolds 33 to 36 and the shapes and arrangements of the inlet slits and the outlet slits extending from the manifolds 33 to 36 to the bipolar plate 31.

As illustrated in FIGS. 4 and 5, the cell frame 3 includes frame-facing surfaces 30f and 30b (refer to cross-hatched areas), which face other cell frames 3 in the cell stack 2 (FIG. 3). The frame-facing surface 30f (30b) is an area of one surface (the other surface) of the cell frame 3 except for the manifolds 33 to 36, the inlet slits, the outlet slits, and the sealing groove 37s. In this example, in order to address the above-described leakage of an electrolyte from the cell stack 2, the frame-facing surfaces 30f and 30b are provided so as to have a surface roughness Ra (arithmetical mean roughness in JIS B0601:2001) of 0.03 µm or more and 3.2 µm or less. The surface roughness Ra can be determined by performing measurements for 10 or more regions in the frame-facing surfaces 30f and 30b with a commercially available measurement instrument, and by averaging the measurement results.

Figure 6:
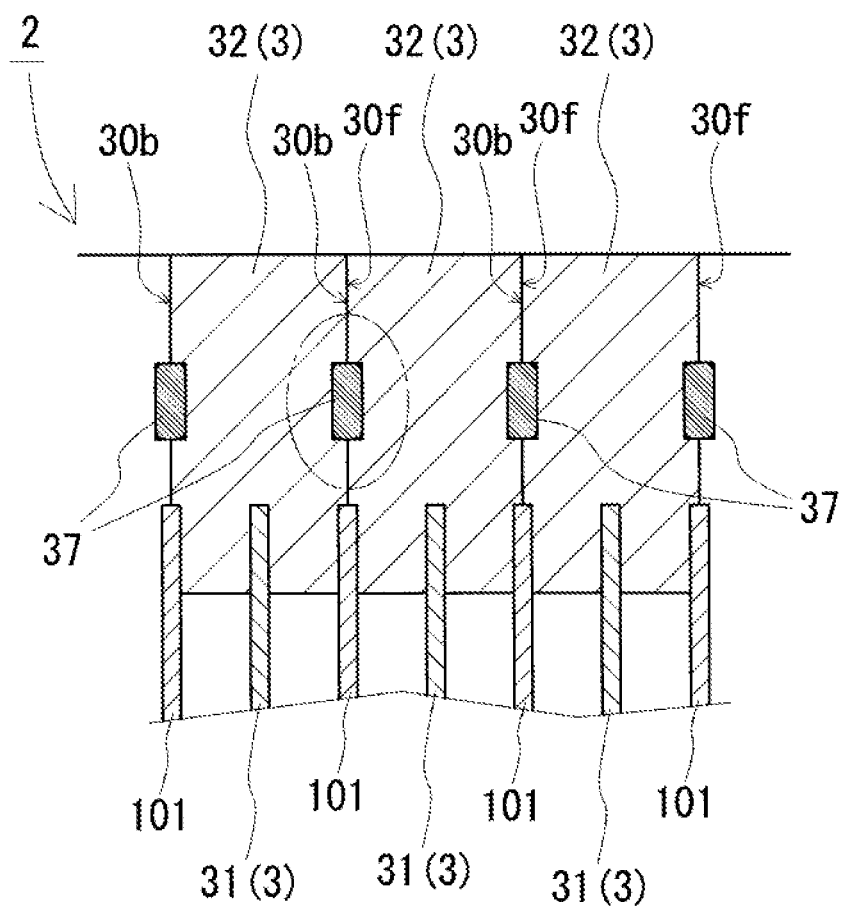
FIG. 6 is a partial sectional view of a cell stack according to an embodiment.

FIG. 6 is a partial sectional view of a cell stack 2 provided by stacking such cell frames 3. The partial sectional view in FIG. 6 corresponds to a longitudinal section of regions in and near the outer peripheries of the cell frames 3 in the cell stack 2. As illustrated in FIG. 6, when the frame-facing surfaces 30f and 30b, which face each other, have a surface roughness Ra of 0.03 µm or more, an appropriate frictional force is exerted between the frame-facing surfaces 30f and 30b. As a result, during transportation of the cell stack 2 or during circulation of electrolytes through the cell stack 2, adjacent cell frames 3 and 3 are less likely to be displaced from each other. When the frame-facing surfaces 30f and 30b have a surface roughness Ra of 3.2 µm or less, large gaps are less likely to be formed between the frame bodies 32 of adjacent cell frames 3. Thus, when a cell stack 2 is produced with cell frames 3 having frame-facing surfaces 30f and 30b having a surface roughness Ra of 0.03 µm or more and 3.2 µm or less, during circulation of electrolytes through the cell stack 2, the electrolytes are less likely to leak from the cell stack 2. The frame-facing surfaces 30f and 30b preferably have a surface roughness Ra of 0.03 µm or more and 3.2 µm or less, more preferably 0.05 µm or more and 1.5 µm or less.

Figure 7:
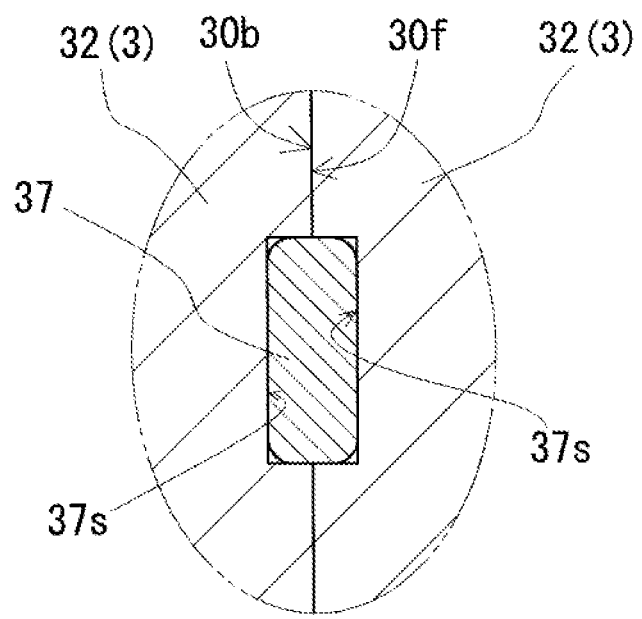
FIG. 7 is a partially enlarged view of a region in and near the sealing grooves in FIG. 6.

As illustrated in an enlarged sectional view in FIG. 7, in the cell frames 3 of this example, the sealing grooves 37s are provided so as to have an inner peripheral surface that also has a surface roughness Ra of 0.03 µm or more and 3.2 µm or less. The sealing grooves 37s are provided so as to have an inner peripheral surface that has a surface roughness Ra of 0.03 µm or more, so that an appropriate frictional force is exerted between the inner peripheral surface of such a sealing groove 37s and the loop-shaped sealing member 37. As a result, even when a stress is applied in a direction in which adjacent cell frames 3 are displaced from each other, sliding of the loop-shaped sealing member 37 in the sealing grooves 37s can be suppressed, to thereby suppress coming off of the loop-shaped sealing member 37 from the sealing grooves 37s. When the sealing grooves 37s are provided so as to have an inner peripheral surface that has a surface roughness Ra of 3.2 µm or less, the loop-shaped sealing member 37 compressed and deformed within the sealing grooves 37s firmly adheres to, with no gaps, the inner peripheral surfaces of the sealing grooves 37s. As a result, the sealing performance of the loop-shaped sealing member 37 is enhanced and the loop-shaped sealing member 37 is less likely to come off from the sealing grooves 37s. The sealing grooves 37s are preferably provided so as to have a surface roughness Ra of 0.03 µm or more and 3.2 µm or less, more preferably 0.05 µm or more and 1.5 µm or less.

Test Examples

Five cell stacks (Test bodies A to E) having different configurations are prepared; electrolytes are circulated through each cell stack and a test is performed as to whether or not the electrolytes leak to the outside of the cell stack. The schematic configurations of Test bodies A to E are as follows.

Test Body A

The cell stack of Test body A is the same as the cell stack 2 described in Embodiment 1. Incidentally, the frame-facing surfaces 30f and 30b (FIG. 6) have a surface roughness Ra of 0.03 μm; and the sealing grooves 37s (FIG. 7) have an inner peripheral surface that has a surface roughness Ra of 0.03 μm.

Test Body B

The cell stack of Test body B is the same as the cell stack of Test body A except that the frame-facing surfaces 30f and 30b (FIG. 6) have a surface roughness Ra of 1.5 μm, and the sealing grooves 37s (FIG. 7) have an inner peripheral surface that has a surface roughness Ra of 1.5 μm.

Test Body C

The cell stack of Test body C is the same as the cell stack of Test body A except that the frame-facing surfaces 30f and 30b (FIG. 6) have a surface roughness Ra of 3.2 μm, and the sealing grooves 37s (FIG. 7) have an inner peripheral surface that has a surface roughness Ra of 3.2 μm.

Test Body D

The cell stack of Test body D is the same as the cell stack of Test body A except that the frame-facing surfaces 30f and 30b (FIG. 6) have a surface roughness Ra of 0.01 μm, and the sealing grooves 37s (FIG. 7) have an inner peripheral surface that has a surface roughness Ra of 0.01 μm.

Test Body E

The cell stack of Test body E is the same as the cell stack of Test body A except that the frame-facing surfaces 30f and 30b (FIG. 6) have a surface roughness Ra of 3.5 μm, and the sealing grooves 37s (FIG. 7) have an inner peripheral surface that has a surface roughness Ra of 3.5 μm.

Electrolytes are supplied through each of Test bodies A to E. At this time, the pressure to the electrolytes supplied is gradually increased. As a result, adjacent cell frames in Test body D are partially displaced from each other and an electrolyte leaks from the displaced portion. In Test body E, adjacent cell frames are not displaced from each other, but an electrolyte leaks. By contrast, in Test bodies A to C in which the electrolytes are supplied under the same pressure, adjacent cell frames are not displaced from each other and the electrolytes do not leak.

The results in Test Examples have demonstrated the following: cell frames provided so as to have frame-facing surfaces that have a surface roughness within the predetermined range, are effective in order to suppress leakage of electrolytes from the cell stack.

The invention claimed is:

1. A frame body of a redox flow battery, comprising: a frame body portion supporting a bipolar plate of a cell frame on an outer peripheral side of the bipolar plate, the frame body portion having a frame-contacting surface that is to face and physically contact, when a plurality of the cell frames are stacked, a frame body of another cell frame that is adjacent to the cell frame in a stacking direction, wherein the frame-contacting surface has a surface roughness Ra of 0.03 μm or more and 3.2 μm or less.

2. The frame body according to claim 1, comprising a sealing groove into which a loop-shaped sealing member is inserted, wherein the sealing groove has an inner peripheral surface having a surface roughness Ra of 0.03 μm or more and 3.2 μm or less.

3. A cell frame comprising the frame body according to claim 1, and a bipolar plate supported by the frame body.

4. A cell stack comprising a plurality of cell frames stacked, the cell stack being used for a redox flow battery, wherein the cell frames include the cell frame according to claim 3.

5. The cell stack according to claim 4, comprising a loop-shaped sealing member disposed between frame bodies of a pair of the cell frames adjacent to each other in the stacking direction.

6. A redox flow battery comprising a cell stack, a positive electrode electrolyte tank, and a negative electrode electrolyte tank, wherein the cell stack is the cell stack according to claim 4.

* * * * *